US010717364B2

(12) United States Patent
Ganter et al.

(10) Patent No.: US 10,717,364 B2
(45) Date of Patent: Jul. 21, 2020

(54) SYSTEM AND METHOD FOR SUPPLYING ENERGY TO AN ELECTRICAL CONSUMER AND AN ENERGY STATION

(71) Applicant: POWERJames GmbH, Mannheim (DE)

(72) Inventors: Axel Ganter, Mannheim (DE); Jonas Carl Mossler, Ilvesheim (DE); Thomas Steckenborn, Mannheim (DE)

(73) Assignee: POWERJames GmbH, Mannheim (DE)

( * ) Notice: Subject to any disclaimer, the term of this patent is extended or adjusted under 35 U.S.C. 154(b) by 0 days.

(21) Appl. No.: 15/748,131

(22) PCT Filed: Jul. 27, 2016

(86) PCT No.: PCT/DE2016/200345
§ 371 (c)(1),
(2) Date: Jan. 26, 2018

(87) PCT Pub. No.: WO2017/016563
PCT Pub. Date: Feb. 2, 2017

(65) Prior Publication Data
US 2018/0222341 A1 Aug. 9, 2018

(30) Foreign Application Priority Data

Jul. 27, 2015 (DE) .................. 10 2015 214 164

(51) Int. Cl.
H02J 7/00 (2006.01)
B60L 11/18 (2006.01)
G06Q 20/32 (2012.01)
G07F 15/00 (2006.01)
B60L 53/16 (2019.01)
B60L 53/60 (2019.01)
B60L 53/34 (2019.01)

(52) U.S. Cl.
CPC ........... B60L 11/1838 (2013.01); B60L 53/16 (2019.02); B60L 53/34 (2019.02); B60L 53/60 (2019.02);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS

2010/0235006 A1* 9/2010 Brown ................ B60L 11/1833
700/286
2011/0109262 A1* 5/2011 Iizuka .................. B60L 11/182
320/108
(Continued)

FOREIGN PATENT DOCUMENTS

| DE | 10 2011 056 651 A1 | 6/2013 |
| DE | 10 2012 106 499 A1 | 5/2014 |
| WO | 2013/185860 A1 | 12/2013 |

OTHER PUBLICATIONS

International Search Report for Application No. PCT/DE2016/200345, 7 pages.
(Continued)

Primary Examiner — Arun C Williams
(74) Attorney, Agent, or Firm — Seed Intellectual Property Law Group LLP

(57) ABSTRACT

A system for supplying energy to an electrical consumer—in particular, for charging a battery-operated device—preferably, a vehicle with an electric drive—includes an energy station, a mobile terminal, and a computing device. The energy station has a communications device for exchanging data with the mobile terminal, and data can be transmitted from the mobile terminal via a transmitting device to the computing device so that data from the energy station can be transferred via the mobile terminal to the computing device. Moreover, an energy station and a method for transmitting energy to an electrical consumer are presented.

19 Claims, 3 Drawing Sheets

(52) U.S. Cl.
CPC .......... *G06Q 20/32* (2013.01); *G07F 15/003* (2013.01); *G07F 15/005* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01)

(58) Field of Classification Search
USPC .......................................................... 320/109
See application file for complete search history.

(56) References Cited

U.S. PATENT DOCUMENTS

| | | | |
|---|---|---|---|
| 2011/0204845 A1* | 8/2011 | Paparo | H01F 38/14 320/108 |
| 2011/0302078 A1* | 12/2011 | Failing | B60L 3/00 705/39 |
| 2012/0095830 A1 | 4/2012 | Contreras Delpiano et al. | |
| 2013/0035812 A1 | 2/2013 | Bernard | |
| 2013/0110296 A1* | 5/2013 | Khoo | G06F 1/26 700/286 |
| 2015/0102775 A1 | 4/2015 | Von Novak, III et al. | |
| 2015/0193990 A1 | 7/2015 | Jones et al. | |

OTHER PUBLICATIONS

International Preliminary Report on Patentability, dated Jan. 30, 2018, for International Application No. PCT/DE2016/200345, 9 pages.

Written Opinion of the International Searching Authority, dated Dec. 5, 2016, for International Application No. PCT/DE2016/200345, 5 pages (English Translation).

* cited by examiner

SYSTEM AND METHOD FOR SUPPLYING ENERGY TO AN ELECTRICAL CONSUMER AND AN ENERGY STATION

BACKGROUND

Technical Field

The present disclosure relates to a system and method for supplying energy to an electrical consumer—in particular, for charging a battery-operated device—preferably, a vehicle with an electric drive. Moreover, the present disclosure relates to an energy station for supplying energy to an electrical consumer.

Description of the Related Art

Methods and systems, as well as energy stations, i.e., chargers, for charging a battery-operated device have been known for years from the prior art. For example, electric vehicles are charged at charging stations known as electric service stations. In the simplest case, these are designed as a plug-in socket where the electric vehicle can be charged by a cable connection.

The expansion of electric mobility has been a declared political and economic goal for several years. In addition to the development of powerful and reliable vehicles, the expansion of the network of charging stations is an essential criterion for increasing the acceptance of this new technology by the consumer. A relatively dense network of charging stations is needed, due to the generally short range of electric vehicles and the very long charging time.

"Smart charging stations" are known for billing the costs arising from charging to the electric vehicle user. These require a permanent Internet connection, in order to exchange the data required for billing with a billing unit such as a server or computer. The billing unit bills the costs arising from charging to the respective user.

Accordingly, the location at which such a charging station is installed must provide a wired or at least wireless Internet connection. Consequently, the installation of smart charging stations in an existing parking garage is associated with significant effort. Parking garages normally do not have any cables for providing an Internet connection. Furthermore, a wireless network can only be realized with significant effort, given the solid construction of parking garages.

This problem is solved in that the charging stations are selected individually by employees of the operating company, so that the respective users can be billed the costs arising from their charging procedure. The effort associated with such a procedure generates high costs.

It is therefore possible to install charging stations at any location to improve the charging station network only with significant outlays in terms of construction, time, and revenue.

Moreover, energy stations for supplying energy to electrical consumers at publicly accessible locations, such as boilers at a camping site, a boat, a wharf, etc., are previously known in practice. In this case as well, it is problematic that the energy station must have an Internet connection, in order to bill the costs associated with supplying energy to the right user.

BRIEF SUMMARY AND INITIAL DESCRIPTION

The aim of the present disclosure is therefore to present a system and a method by which an electrical consumer can be supplied with energy by simply designed means, and the associated arising costs can be easily specifically assigned to the user. Moreover, a corresponding energy station will be presented.

According to the present disclosure, a system for supplying energy to an electrical consumer—in particular, for charging a battery-operated device—preferably, a vehicle with an electric drive—comprising an energy station, a mobile terminal, and a computing device is described, wherein the energy station has a communications device for exchanging data with the mobile terminal, and wherein data from the mobile terminal can be transmitted by the mobile terminal via a transmitting device to the computing device so that data from the energy station can be transferred via the mobile terminal to the computing device.

According to the present disclosure, it was recognized that the underlying aim can be achieved in a surprisingly easy manner by designing a mobile terminal such that it can communicate with both the energy station and the computing device. The mobile terminal accordingly serves to transmit billing data from the energy station to the computing device—similar to a "messenger." Even if the mobile terminal cannot establish a connection to the computing device directly adjacent to the energy station—because, for example, a wireless Internet connection is not available within a parking garage—such a connection will be available to the mobile terminal sooner or later, given its mobile character. For example, the mobile terminal can, via a wireless Internet connection, transfer the billing data previously communicated by the energy station to the billing device after leaving the parking garage. Moreover, it is conceivable that the mobile terminal "entrains" "additional data," such as configuration data, information data, and software updates, and transmits them to the energy station so that bidirectional communication occurs. Accordingly, the energy station could receive data from the mobile terminal, as well as transfer data to the mobile terminal for transferring to an external computing unit such as a billing device. Moreover, the mobile terminal could transfer prepaid data, for example, to the energy device, in order to directly pay costs arising from the supply of energy.

With the system according to the present disclosure, it is furthermore conceivable that a mobile terminal can also receive data from the energy station or the charging station and/or transfer data to it, without a supply of energy. For example, the mobile terminal of a user of the system can automatically receive third-party data—in particular, billing data—from the energy station once it is close enough to the energy station or the charging station that a connection can be established by the communications device. The mobile terminal can transmit the "foreign" data to the computing device or billing device once a corresponding connection is available. Alternatively or in addition, the mobile terminal could transfer "additional data"—in particular, configuration data, information data, software updates, etc.—to the energy station once a connection is established via a communications device.

With regard to the claimed system, the claimed energy station, and the claimed method, it should be noted that the "energy station" can, for example, be designed as a charging station and/or as a power supply. The electric consumer can be camping equipment such as a boiler, a boat, a machine tool, and/or a construction machine. Moreover, the electric consumer can be designed as a battery-operated device—in particular, as a vehicle with an electric drive.

Moreover, the expression, "mobile terminal," is to be understood in the broadest sense. It can, for example, be a cell phone, a smart phone, a handheld computer, a tablet computer, etc. It is, moreover, conceivable that the mobile terminal be integrated in the electric vehicle to be charged, i.e., realized by the electric vehicle. It is essential only that the mobile terminal have interfaces for communicating with the energy station, or the charging station and the computing device, or the billing device. The term, "computing device," is, for example, to be understood as a server, or a computer with an Internet connection. The computing device can specifically be designed as a billing device, with which the costs arising from the supply of energy, such as a charging process, can be billed to the respective user. Alternatively or in addition, the computing device can serve to evaluate consumption data, e.g., from a construction machine and/or a machine tool, so that the system provides a gateway to the "internet of things."

The underlying aim is, moreover, achieved by an energy station for supplying energy to an electric consumer—in particular, for charging a battery-operated device—preferably, for charging a vehicle with an electric drive—that comprises a connection to a power grid, means of transmitting electrical energy to the consumer, and a communications device for exchanging data with a mobile terminal.

It was initially recognized in accordance with the present disclosure that an energy station such as a charging station does not necessarily have to have an Internet connection. Instead, the energy station communicates—preferably, exclusively—with the mobile terminal. Accordingly, the energy station can be installed at any location, wherein only a connection to a power grid is needed. By means of this refined design, parking spaces in a parking garage, for example, can be equipped with so-called "park and charge" spaces at which electric vehicles can be charged, wherein the arising costs can be easily billed to the to the user. The energy station accordingly can be installed at a wide variety of locations.

Advantageously, a plug is arranged for realizing the connection to the power grid. Accordingly, the energy station can be connected to a conventional socket such as a grounded socket. It is therefore possible to install the energy station in a particularly easy manner.

It is, moreover, conceivable for the means of transmitting electrical energy to be realized by at least one coil for inductive charging. This design enables a wireless and, consequently, very convenient way of supplying the electrical consumer with energy, such as charging the battery operated device. Alternatively or in addition, the means of transmission can be realized by a plug. The plug can, for example, be a grounded socket plug, a camping plug (CED blue), or a three-phase current plug (CED red). A plug-in connection is distinguished by its simple design and safe transmission of electrical energy.

In order to realize a reliable data connection between the energy station and the mobile terminal, the communications device can be realized as a near-field communications interface (NFC communications interface), and/or a Bluetooth interface, and/or an infrared interface. Specifically, any type of wireless or wired communications device is conceivable that ensures a data connection between the energy station and mobile terminal.

An input device can be arranged for entering information—for example, regarding the identification of the user and/or the charging process. The input device can, for example, be designed to input voice commands. Alternatively or in addition, it is also conceivable to provide a touch display as the input device.

It is further noted that the above-described energy station can be part of the system as described herein. Consequently, the features and indicated advantages regarding the claims of the energy station also relate to the system according to the present disclosure.

The underlying aim is further achieved by a method for supplying energy to an electrical consumer, such as for charging a battery-operated device—in particular, a vehicle with an electric drive—preferably, using a system as described herein and/or an energy station as described herein, comprising the following method steps:

transfer of data, such as identification data and possibly charging data, by means of a mobile terminal to the energy station, activation of the supply of energy—in particular, the charging process—by the energy station, and transmission of data—in particular, billing data—from the energy station to the mobile terminal, and transmission of data—in particular, the billing data—via a preferably mobile network, by the mobile terminal to the computing device.

According to the present disclosure, initially, identification data can be transferred by means of a mobile terminal to an energy station such as a charging station. This can be done via an NFC interface, a Bluetooth interface, and/or an infrared interface. The identification data can be any data that make it possible to assign to the correct user costs arising from the supply of energy to the electrical consumer. Data transferred from the mobile terminal can alternatively or in addition be "additional data" such as configuration data, information data, or software updates, so that bidirectional communication occurs. Accordingly, the energy station could receive data from the mobile terminal, as well as transfer data to the mobile terminal for transferring to an external computing unit such as a billing device. Moreover, the mobile terminal could transfer prepaid data, for example, to the energy device, in order to directly pay costs arising from the supply of energy.

It is, moreover, conceivable that before, during, and/or after transferring the identification data or the "other data," additional data such as charging data relating to the charging process be transferred by the mobile terminal to the energy station or the charging station. The charging station data can, for example, comprise information regarding the desired charging length, the required energy, the device to be charged, etc. The charging station then activates the charging process. Before activating the charging process, and/or during or after the charging process, the charging station can transmit billing data to the mobile terminal. For this, the same communications interface can be used by which the identification data are transferred by the mobile terminal to the charging station. Accordingly, the charging station can advantageously have only one individual communications device for—preferably, exclusively—communicating with the mobile terminal. Alternatively or in addition, it is conceivable for the data to be control data for the energy station or the charging station, so that control data can also be transmitted without an Internet connection in a SmartGrid. At this juncture, it is noted that the data described with reference to the method according to the present disclosure constitute part of the disclosure of the system according to the present disclosure and the energy station according to the present disclosure.

Once the mobile terminal has a connection to a network such as the Internet, the data, such as the billing data, are transferred to a computing device, such as a billing device. The arising costs can be billed to the correct user by the billing device.

Alternatively or in addition, at least part of the data or the charging data can be transferred by a voice command to the energy station. In this regard, it is conceivable for the voice command to be recognized directly by the energy station or recorded by the mobile terminal, such as a smart phone, and transmitted to the energy station.

In a particularly advantageous manner, additional data—in particular, billing data—from at least one previous user can be transmitted from the energy station to the mobile terminal, wherein the data of the previous user are then transferred by the mobile terminal via the network to the billing device. Accordingly, each user of the energy station is reliably billed, even if he has not personally transferred his data via his mobile terminal to the computing device or billing device.

The mobile terminal can, for example, be integrated in the electrical consumer or battery-operated device—the electric vehicle—and/or designed as a smart phone, tablet computer, handheld computer, etc.

At this juncture, it is noted that the aforementioned features of the method according to the present disclosure can also be instantiated as a device. The combination of these features with the features relating to the system and/or the energy station is not only possible, but advantageous.

BRIEF DESCRIPTION OF THE SEVERAL VIEWS OF THE DRAWINGS

There are various options for advantageously designing and developing the teaching of the present disclosure. In this regard, reference is made, on the one hand, to the claims dependent upon claims 2 and 7, and, on the other, to the following explanation of preferred exemplary embodiments of the present disclosure with reference to the drawing. Generally preferred designs and developments of the teaching are also explained in conjunction with the explanation of the preferred exemplary embodiments of the present disclosure with reference to the drawing. In the drawing:

DETAILED DESCRIPTION

Figure 1:
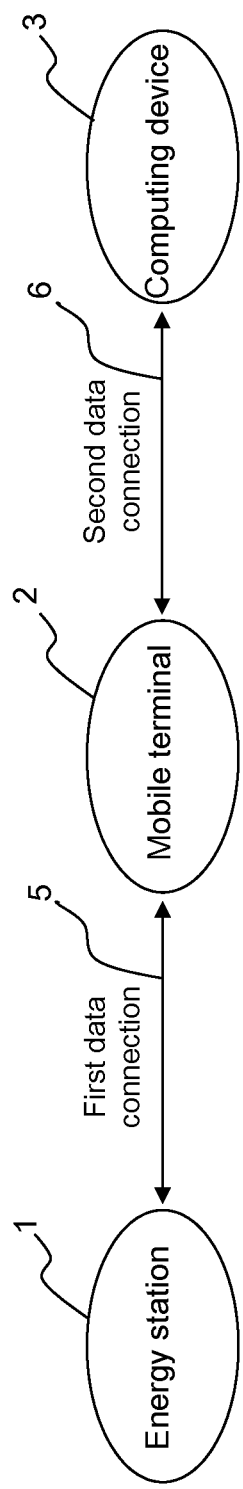
FIG. 1 shows a schematic representation of an embodiment of a system according to the present disclosure.

FIG. 1 shows a schematic representation of an embodiment of a system according to the present disclosure. The system comprises an energy station 1, a mobile terminal 2, and a computing device 3.

The energy station 1 is, for example, designed as a charging station 1 and serves to charge a battery-operated device, such as a vehicle with an electric drive. By means of a communications device 4, a first data connection 5 is realized between the energy station 1 and the mobile terminal 2, by means of which data can be exchanged. The communications device 4 is not shown in FIG. 1. The mobile terminal 2 accordingly has an interface that can be linked to the communications device 4 of the energy station 1, in order to realize the first data connection 5.

Moreover, the mobile terminal 2 comprises a transmitting device or a transmitting/receiving device for communicating via a second data connection 6—preferably, an Internet connection—in particular, via a mobile network—to the computing device 3—for example, a billing device.

From FIG. 1, it is clear that the energy station 1 exclusively exchanges data with the mobile terminal 2 and thereby transmits the data to the mobile terminal 2. Once the mobile terminal 2 has a second data connection 6, it transfers this data to the computing device 3. Accordingly, the energy station designed as a charging station 1 can, for example, be realized without an Internet connection, and nonetheless does not have to be read out manually by employees of the operating company for the purpose of billing.

Figure 2:
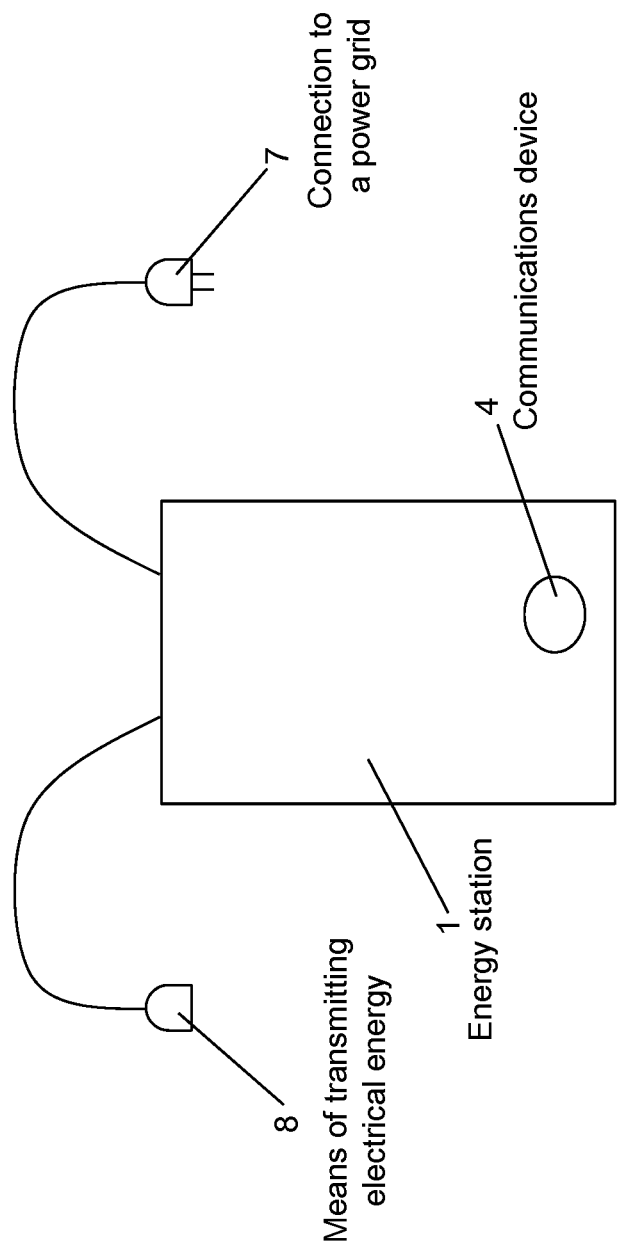
FIG. 2 shows a schematic representation of an exemplary embodiment of an energy station according to the present disclosure.

FIG. 2 shows a schematic representation of an exemplary embodiment of an energy station 1 according to the present disclosure. The energy station 1 comprises a connection 7 to a power grid, wherein, in the exemplary embodiment depicted here, the connection 7 is realized by a plug 7. Moreover, means are provided for transmitting electric energy to the consumer. The means 8 are also realized as a plug 8. It is furthermore conceivable for the means 8 of transmitting electrical energy to be designed as at least one coil for inductively charging the consumer.

Moreover, the energy station 1 comprises a communications device 4 for exchanging data with the mobile terminal 2 (not shown). From FIG. 2, it is clear that the modular design of the energy station 1 allows it to be used in a particularly easy manner—in particular, for equipping any parking space, such as in a parking garage.

Figure 3:
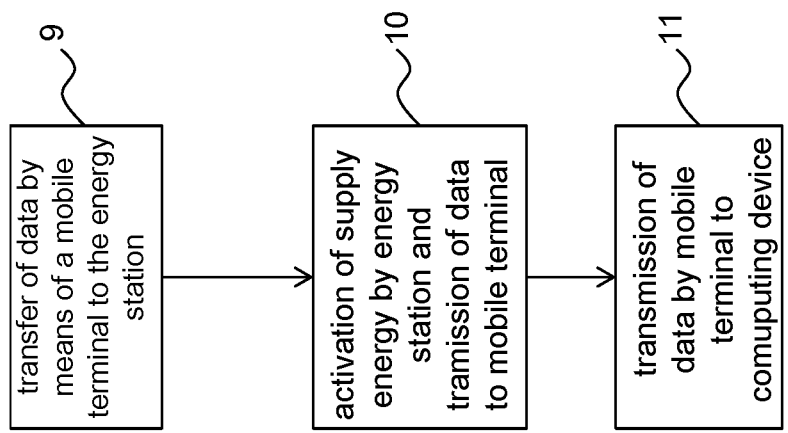
FIG. 3 shows a flowchart of an exemplary embodiment of a method according to the present disclosure.

FIG. 3 shows a flowchart of an exemplary embodiment of a method according to the present disclosure.

In a first method step 9, data—in particular, identification data and possibly charging data—are transmitted by the mobile terminal 2 to the energy station 1. In the second method step 10, the supply of energy by the energy station 1 is activated so that electrical energy is transmitted via the means 8 from the energy station 1 to the consumer—the electric vehicle. Moreover, data—in particular, billing data—are transferred by the energy station 1 to the mobile terminal 2. In this regard, the data can, in particular, relate to the currently executed charging process and also comprise billing data for a previous user.

In a third method step 11, the data are transmitted from the mobile terminal 2 of the second data connection 6 to a computing device 3—preferably, a billing device 3. Specifically, transmission is carried out via an Internet connection—preferably, a mobile Internet connection.

With regard to other advantageous embodiments of the devices and method according to the present disclosure, reference is made to the general part of the description and accompanying claims, to avoid repetition.

It is expressly noted in conclusion that the above-described exemplary embodiments of the devices according to the present disclosure and the method according to the present disclosure serve only to explain the claimed teaching which, however, is not restricted to the exemplary embodiments.

LIST OF REFERENCE SYMBOLS

1 Energy station
2 Mobile terminal
3 Computing device
4 Communications device
5 First data connection
6 Second data connection
7 Connection
8 Means of transmitting electrical energy 9 First method step
10 Second method step
11 Third method step The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for supplying energy to an electrical consumer for charging a battery-operated device, comprising:
   an energy station,
   a mobile terminal, and
   a computing device,
   wherein the energy station has a communications device for exchanging data with the mobile terminal,
   wherein data can be transmitted from the mobile terminal via a transmitting device to the computing device so that data from the energy station can be transferred via the mobile terminal to the computing device even if the mobile terminal cannot establish a connection to the computing device in an immediate vicinity of the energy station,
   wherein the mobile terminal transmits the data to the computing device once the mobile terminal has established a connection to the computing device; and
   wherein billing data from at least one previous user are transmitted from the energy station to the mobile terminal, and wherein the billing data of the previous user are then transferred by the mobile terminal via the transmitting device to the computing device.

2. An energy station for supplying energy to an electrical consumer for charging a battery-operated device, comprising:
   a connection to a power grid,
   means for transmitting electrical energy to the electrical consumer, and
   a communications device for exchanging data with a mobile terminal,
   wherein data can be transmitted from the mobile terminal via a transmitting device to a computing device so that data from the energy station can be transferred via the mobile terminal to the computing device even if the mobile terminal cannot establish a connection to the computing device in an immediate vicinity of the energy station, and
   wherein the mobile terminal transmits the data to the computing device once the mobile terminal has established a connection to the computing device; and
   wherein billing data from at least one previous user are transmitted from the energy station to the mobile terminal, and wherein the billing data of the previous user are then transferred by the mobile terminal via the transmitting device to the computing device.

3. The energy station according to claim 2, wherein a plug is arranged for realizing the connection to the power grid.

4. The energy station according to claim 2, wherein the means for transmitting electrical energy includes at least one coil for inductive charging and/or a plug.

5. The energy station according to claim 2, wherein the communications device is at least one of an NFC interface, a Bluetooth interface, or an infrared interface.

6. The energy station according to claim 2, further comprising an input device.

7. A method for supplying energy to an electrical consumer for charging a battery-operated device using an energy station that includes a connection to a power grid, means of transmitting electrical energy to the consumer, and a communications device for exchanging data with a mobile terminal, the method comprising:
   transferring data by way of the mobile terminal to the energy station,
   activating a supply of energy in a charging process by the energy station, and transmitting data from the energy station to the mobile terminal, and
   transmitting data via a mobile network, by the mobile terminal, to a computing device,
   wherein data is transmitted from the mobile terminal to the computing device such that data from the energy station can be transferred via the mobile terminal to the computing device even if the mobile terminal cannot establish a connection to the computing device in an immediate vicinity of the energy station,
   wherein the mobile terminal transmits the data to the computing device once the mobile terminal has established a connection to the computing device, and
   wherein billing data from at least one previous user are transmitted from the energy station to the mobile terminal, and wherein the billing data of the user are then transferred by the mobile terminal via the mobile network to the computing device.

8. The method according to claim 7, wherein the data are transferred via a voice command to the energy station.

9. The method according to claim 7, wherein a smart phone is used as the mobile terminal.

10. The system according to claim 1, wherein the battery-operated device is a vehicle with an electric drive.

11. The energy station according to claim 2, wherein the battery-operated device is a vehicle with an electric drive.

12. The energy station according to claim 6, wherein the input device is a device for entering voice commands.

13. The method according to claim 7, wherein the data transferred by way of a mobile terminal to the energy station is identification data.

14. The method according to claim 7, wherein the data transferred by way of the mobile terminal to the energy station is identification data and charging data.

15. The method according to claim 7, wherein the data transmitted from the energy station to the mobile terminal is billing data.

16. The method according to claim 7, wherein the data transmitted by the mobile terminal to the computing device is billing data.

17. The method according to claim 7, wherein the data is transmitted by the mobile terminal to the computing device via a mobile network.

18. The method according to claim 8, wherein the data transferred to the energy station via a voice command is charging data.

19. The method according to claim 7, wherein the electrical consumer is used as the mobile terminal.

\* \* \* \* \*